J. C. TEAGUE.
Combined Plow and Harrow.

No. 205,317. Patented June 25, 1878.

WITNESSES
Saml R. Turner
C. M. Sites

INVENTORS
Joseph C. Teague
By R. S. & A. P. Lacey
Attorneys

UNITED STATES PATENT OFFICE.

JOSEPH C. TEAGUE, OF WABASH, INDIANA.

IMPROVEMENT IN COMBINED PLOW AND HARROW.

Specification forming part of Letters Patent No. 205,317, dated June 25, 1878; application filed April 23, 1878.

*To all whom it may concern:*

Be it known that I, JOSEPH C. TEAGUE, of Wabash, in the county of Wabash and State of Indiana, have invented certain new and useful Improvements in Combined Plow and Harrow; and I do hereby declare that the following is a full, clear, and exact description thereof, which will enable others skilled in the art to which it pertains to make and use the same, reference being had to the accompanying drawing, and to the letters of reference marked thereon, which form a part of this specification, and in which—

Figure 1:
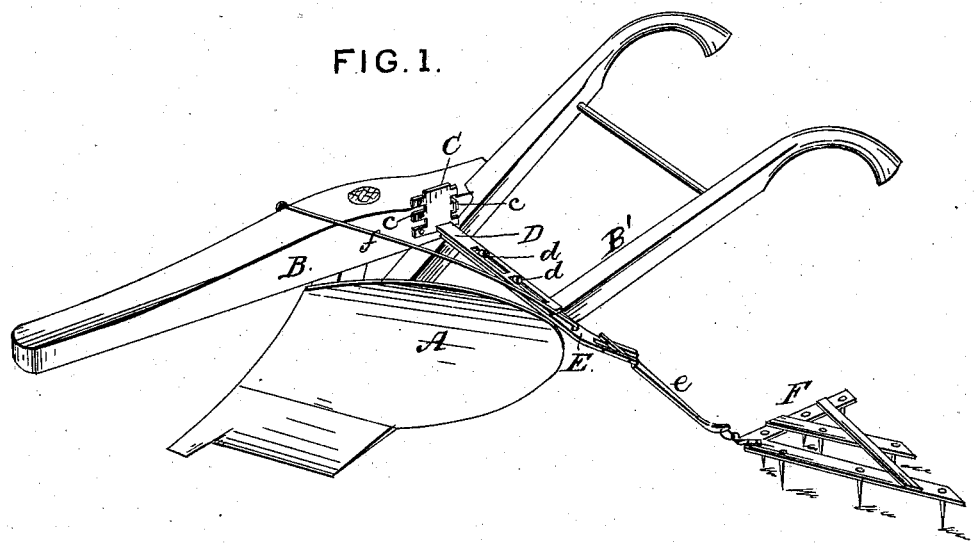
Figure 2:
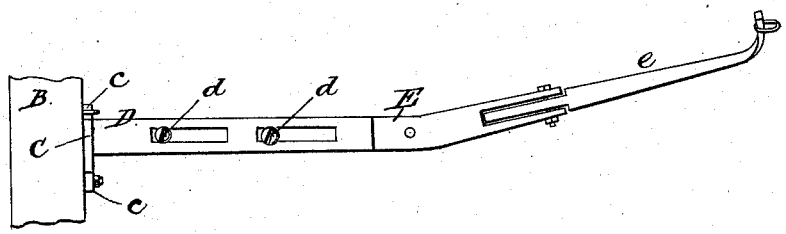
Figure 3:
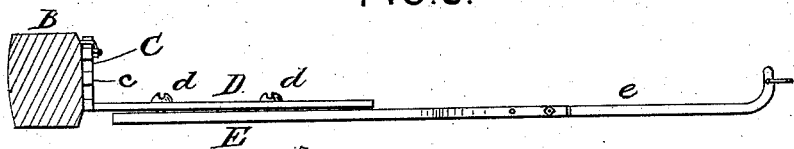
Figure 4:
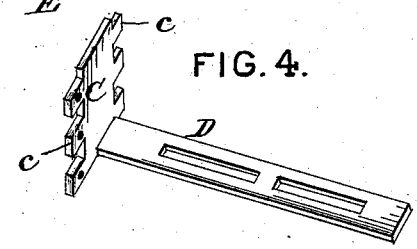

Figure 1 is a perspective view of a plow with my improved attachment adjusted thereto. Figs. 2 and 3 are detached views, in plan and side respectively, of said attachment; and Fig. 4 is a perspective view of a detached portion thereof.

The same part in the several figures is denoted by like letters.

This invention relates to certain improvements in plow attachments, by which a harrow may be used in connection therewith, and the ridge of earth thrown up by the plow be flattened, or the earth prevented from falling back into the furrow, substantially as hereinafter more fully set forth.

In the annexed drawing, A marks a plow of ordinary or other construction. To the beam B of said plow is attached an upright plate, C, secured to the side of the beam B, and provided with a slotted bar or arm, D, extending across the front of the plow, and resting on the top of the mold-board A and against the front edge of the handle B'.

The plate C is provided upon each side with one or more tenons or projections, c c, through which may be inserted screw-bolts; or they may be embraced by staples entering the beam B, as may be desired, the object of which is to permit the vertical adjustment of the bar D and its adjuncts, to adapt them to mold-boards of different heights, according to the size of the plow used.

To the bar D is attached, by adjusting-screws d d, an extensible bar, E, to accommodate the attachment to mold-boards of different widths.

The attachment formed of the above-described parts acts in a twofold capacity: first, to flatten the ridge of earth thrown up by the plow and turn it outwardly from the rear or outer edge of the mold-board, and thus prevent its falling back into the furrow; and, secondly, to permit the use of a harrow in connection with the plow to pulverize the earth or ridge formed by the plow.

The outer end of the bar E is provided with a slot to receive a tongue-bar, *e*, to which the harrow F is attached, as seen in Fig. 1.

When the harrow is not in use, the bar *e* is held in a horizontal position, or sufficiently rigid to flatten the earth or ridge, and thus assist the bar E in its work.

To enable the bar *e* to yield to prevent the breaking of the attachment in the event of its contact with an unyielding obstruction, it (the bar *e*) is held in its horizontal position by a wooden pin inserted through the inner aperture in the bar E and through a coincident aperture in the tongue of the bar *e*, as seen in Fig. 1.

A rod or brace, *f*, connects the outer end of the attachment with the plow-beam B.

The bar D is held rigidly in position by its attachments *c c* and by the mold-board A and handle B', so that it is not liable to be twisted or otherwise pulled out of position.

Whatever strain is caused by the weight of the harrow or by the sod is exerted on the extensible bar E, which strain is relieved by the brace *f*. This device, as has been hereinbefore intimated, serves as a furrow-turner.

The outer end of the hinged bar *e* is slightly curved upward, as shown, so that it will not catch in the sod; and as the latter is delivered from the mold-board it is caught and forced outward and downward, and is thus prevented from turning back into the furrow.

What I claim is—

1. In a plow, the combination, with the beam, mold-board, and handles, of the vertically-adjustable attachment, consisting of the horizontal bar D and vertical plate C, having the lateral extensions *c c*, and secured rigidly to the side of the beam B, and extended across the plow and over, with its outer end resting on the top of the mold-board and against the handle B', and adapted substantially as and for the purpose set forth.

2. The combination of the slotted bar D, constructed with the vertical plate C, having the lateral extensions c c and secured to the side of the beam B, and extended across the plow and resting on the top of the mold-board A and against the front edge of the handle B', and the laterally-extensible arm E, having on its outer end a pivoted and vertically-swinging arm, e, arranged and adapted substantially as and for the purposes set forth.

In testimony that I claim the foregoing as my own I affix my signature in presence of two witnesses.

JOSEPH C. TEAGUE.

Witnesses:
  OLIVER M. TEAGUE,
  M. I. THOMAS.